US011865996B2

(12) United States Patent
Fischer et al.

(10) Patent No.: US 11,865,996 B2
(45) Date of Patent: Jan. 9, 2024

(54) SEAT-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Angelo J. Adler, Shelby Township, MI (US); Alexandra E. Smith, Richmond, MI (US); Daniel R. Sutherland, Richmond Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/975,186

(22) PCT Filed: Feb. 27, 2019

(86) PCT No.: PCT/US2019/019707
§ 371 (c)(1),
(2) Date: Aug. 24, 2020

(87) PCT Pub. No.: WO2019/168887
PCT Pub. Date: Sep. 6, 2019

(65) Prior Publication Data
US 2020/0391691 A1     Dec. 17, 2020

Related U.S. Application Data

(60) Provisional application No. 62/666,771, filed on May 4, 2018, provisional application No. 62/636,899, filed on Mar. 1, 2018.

(51) Int. Cl.
*B60R 21/2338*    (2011.01)
*B60R 21/207*     (2006.01)
*B60R 21/231*     (2011.01)

(52) U.S. Cl.
CPC ........ *B60R 21/2338* (2013.01); *B60R 21/207* (2013.01); *B60R 2021/23146* (2013.01); *B60R 2021/23388* (2013.01)

(58) Field of Classification Search
CPC .............. B60R 21/2338; B60R 21/207; B60R 2021/23146; B60R 2021/23388
See application file for complete search history.

(56) References Cited

U.S. PATENT DOCUMENTS 5,636,862 A * 6/1997 Cheung ................ B60R 21/207
                                                         280/730.2
6,343,810 B1    2/2002 Breed
(Continued)

FOREIGN PATENT DOCUMENTS

DE  102013015312 A1 *  3/2015  ........... B60R 21/207
WO  WO-2019121222 A1 *  6/2019

OTHER PUBLICATIONS

WO-2019121222-A1 (machine translation) (Year: 2019).*

*Primary Examiner* — Jason D Shanske
*Assistant Examiner* — Joselynn Y Sliteris
(74) *Attorney, Agent, or Firm* — TAROLLI, SUNDHEIM, COVELL & TUMMINO L.L.P.

(57) ABSTRACT

A restraint system for helping to protect an occupant of a vehicle having a roof and a cabin with a seat for the occupant includes an airbag. The airbag has a stored condition within the vehicle seat and is inflatable to deploy laterally in the cabin to a deployed condition in front of the occupant. The airbag is configured to utilize the vehicle seat as a reaction surface for restraining the movement of the airbag in response to occupant penetration into the airbag.

18 Claims, 9 Drawing Sheets

(56) References Cited

U.S. PATENT DOCUMENTS

| | | | | |
|---|---|---|---|---|
| 7,549,672 | B2* | 6/2009 | Sato | B60R 21/207 |
| | | | | 280/729 |
| 8,690,187 | B2* | 4/2014 | Fukawatase | B60R 21/207 |
| | | | | 280/730.2 |
| 8,882,138 | B1 | 11/2014 | Hicken et al. | |
| 8,899,619 | B2* | 12/2014 | Fukawatase | B60R 21/207 |
| | | | | 280/749 |
| 9,556,882 | B2* | 1/2017 | Heidingsfelder | F02C 9/22 |
| 9,744,932 | B1 | 8/2017 | Faruque et al. | |
| 9,981,624 | B2* | 5/2018 | Perlo | B60R 21/207 |
| 9,994,181 | B1* | 6/2018 | Dubaisi | B60R 21/207 |
| 10,336,283 | B2* | 7/2019 | Rickenbach | B60R 21/233 |
| 10,471,919 | B2* | 11/2019 | Faruque | B60R 21/205 |
| 10,556,563 | B2* | 2/2020 | Song | B60R 21/2338 |
| 10,821,928 | B2* | 11/2020 | Deng | B60R 21/01554 |
| 10,843,652 | B2* | 11/2020 | Byun | B60R 21/2334 |
| 10,870,408 | B2* | 12/2020 | Garnier | B60R 21/2338 |
| 10,875,486 | B2* | 12/2020 | Kim | B60R 21/207 |
| 10,906,495 | B2* | 2/2021 | Nagasawa | B60R 21/0132 |
| 2007/0024033 | A1 | 2/2007 | Suzuki | |
| 2008/0243342 | A1 | 10/2008 | Breed | |
| 2012/0242070 | A1 | 9/2012 | Paxton et al. | |
| 2016/0082915 | A1* | 3/2016 | Madaras | B60R 21/231 |
| | | | | 297/216.2 |
| 2016/0244016 | A1 | 8/2016 | Takeshita et al. | |
| 2017/0225570 | A1 | 8/2017 | El Aile et al. | |
| 2020/0406855 | A1* | 12/2020 | Saito | B60R 21/2338 |
| 2021/0024030 | A1* | 1/2021 | Fuma | B60N 2/427 |
| 2021/0078517 | A1* | 3/2021 | Fischer | B60R 21/2338 |

* cited by examiner

SEAT-MOUNTED OCCUPANT RESTRAINT SYSTEM

CROSS REFERENCE TO RELATED APPLICATIONS

This application is a national stage of International Application No. PCT/US2019/019707, filed Feb. 27, 2019, which claims benefit of U.S. Provisional Appln. Nos. 62/636,899, filed Mar. 1, 2018, and 62/666,771, filed May 4, 2018. The disclosures of these applications are incorporated herein by reference in their entireties.

TECHNICAL FIELD

The present invention relates generally to vehicle airbags and, in particular, relates to seat-mounted airbags that rely on the seat for a reaction surface.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a roof and a cabin with a seat for the occupant includes an airbag. The airbag has a stored condition within the vehicle seat and is inflatable laterally in the cabin to a deployed condition in front of the occupant. The airbag is configured to utilize the vehicle seat as a reaction surface for restraining the movement of the airbag in response to occupant penetration into the airbag.

According to another aspect, a restraint system for helping to protect an occupant of a vehicle having a roof and a cabin with a seat for the occupant includes an airbag having a stored condition within a base of the vehicle seat. The airbag is inflatable laterally in the cabin to a deployed condition in front of the occupant. First and second tethers each have a first end connected to the airbag and a second end connected to the vehicle seat behind the occupant. The first and second tethers are configured to transmit the energy of an occupant penetrating the airbag to the vehicle seat such that the airbag utilizes the vehicle seat as a reaction surface for restraining the movement of the airbag in response to occupant penetration.

According to another aspect, taken alone or in combination with any other aspect, the airbag is positioned in a base of the seat.

According to another aspect, taken alone or in combination with any other aspect, the airbag is positioned in a seatback of the seat.

According to another aspect, taken alone or in combination with any other aspect, at least one tether has a first end connected to the airbag and a second end connected to the vehicle seat, the at least one tether being configured to transmit the energy of an occupant penetrating the airbag to the vehicle seat.

According to another aspect, taken alone or in combination with any other aspect, first and second tethers each have a first end connected to the airbag and a second end connected to the vehicle seat. The first and second tethers are configured to transmit the energy of an occupant penetrating the airbag to the vehicle seat.

According to another aspect, taken alone or in combination with any other aspect, the second end of each tether is connected to the vehicle seat behind the vehicle occupant.

According to another aspect, taken alone or in combination with any other aspect, first and second tether actuation units connect the second ends of the tethers to the vehicle seat. One of the tether actuation units is actuatable in response to detecting an oblique vehicle crash to release one of the first and second tethers and allow the airbag to shift laterally in the cabin in response to occupant penetration.

According to another aspect, taken alone or in combination with any other aspect, the first actuation unit and the first tether are positioned on a right side of the seat and wherein the first actuation unit releases the first tether in response to a left-side oblique vehicle crash.

According to another aspect, taken alone or in combination with any other aspect, the second actuation unit and the second tether are positioned on a left side of the seat and wherein the second actuation unit releases the second tether in response to a right-side oblique vehicle crash.

According to another aspect, taken alone or in combination with any other aspect, an oblique crash sensor connected to the vehicle provides a signal indicative of an oblique vehicle crash. A controller receives the signal from the oblique crash sensor and is connected to the tether actuation unit for releasing the tether in response to the signal.

According to another aspect, taken alone or in combination with any other aspect, first and second tether actuation units connect the second ends of the tethers to the vehicle seat. One of the tether actuation units is actuatable in response to detecting an out of position occupant to release one of the first and second tethers and allow the airbag to shift laterally in the cabin in response to occupant penetration.

According to another aspect, taken alone or in combination with any other aspect, at least one weight sensor is connected to the seat for providing a signal indicative of a position of the occupant in the seat. A controller receives the signal from the at least one weight sensor and is connected to the tether actuation units for releasing one of the first and second tethers in response to the signal.

According to another aspect, taken alone or in combination with any other aspect, a housing is configured to be mounted in the vehicle seat and an inflator provides inflation fluid for inflating the airbag.

According to another aspect, taken alone or in combination with any other aspect, a sensor for sensing the occurrence of an event for which deployment of the airbag is desired and produces a signal indicative thereof. A controller is connected to the sensor and, in response to receiving the signal, actuates an inflator to inflate the airbag to the deployed condition.

Other objects and advantages and a fuller understanding of the invention will be had from the following detailed description and the accompanying drawings.

DETAILED DESCRIPTION

Figure 1:
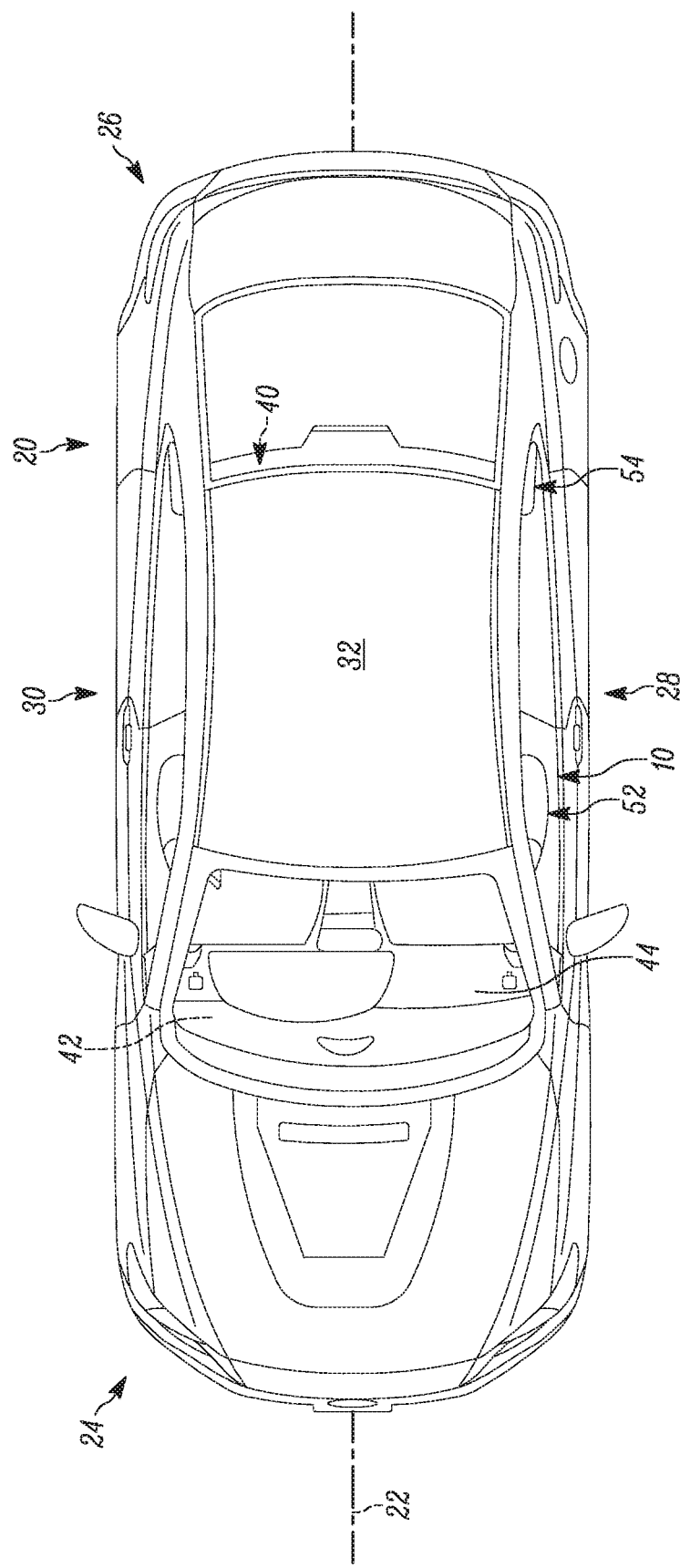
FIG. 1 is a top view of a vehicle including an example seat-mounted, occupant restraint system.
Figure 2:
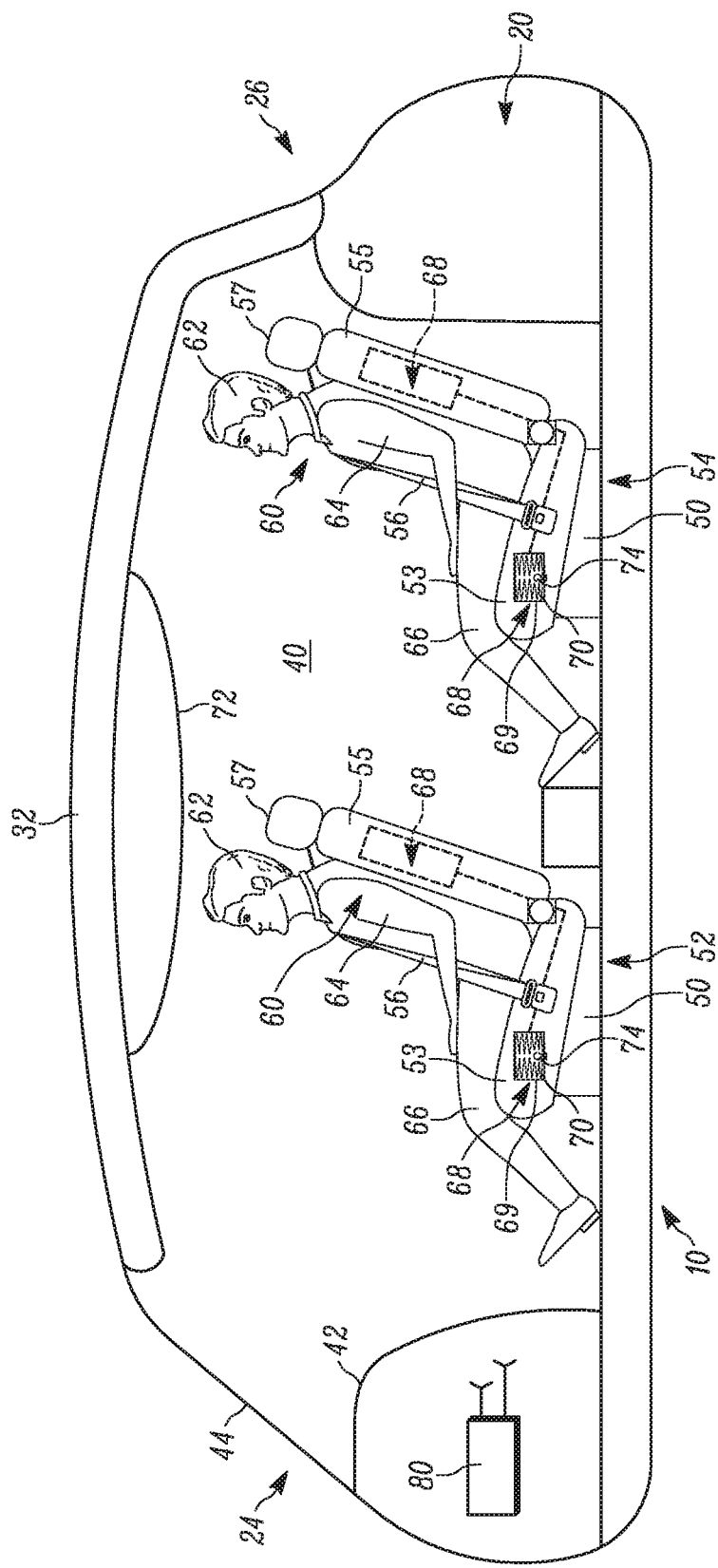
FIG. 2 is a schematic illustration of a cabin of the vehicle with a first seating arrangement and an example airbag of the restraint system in a stored condition.

The present invention relates generally to vehicle airbags and, in particular, relates to seat-mounted airbags that rely on the seat for a reaction surface. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 2, however, the instrument panel can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

Figure 3:
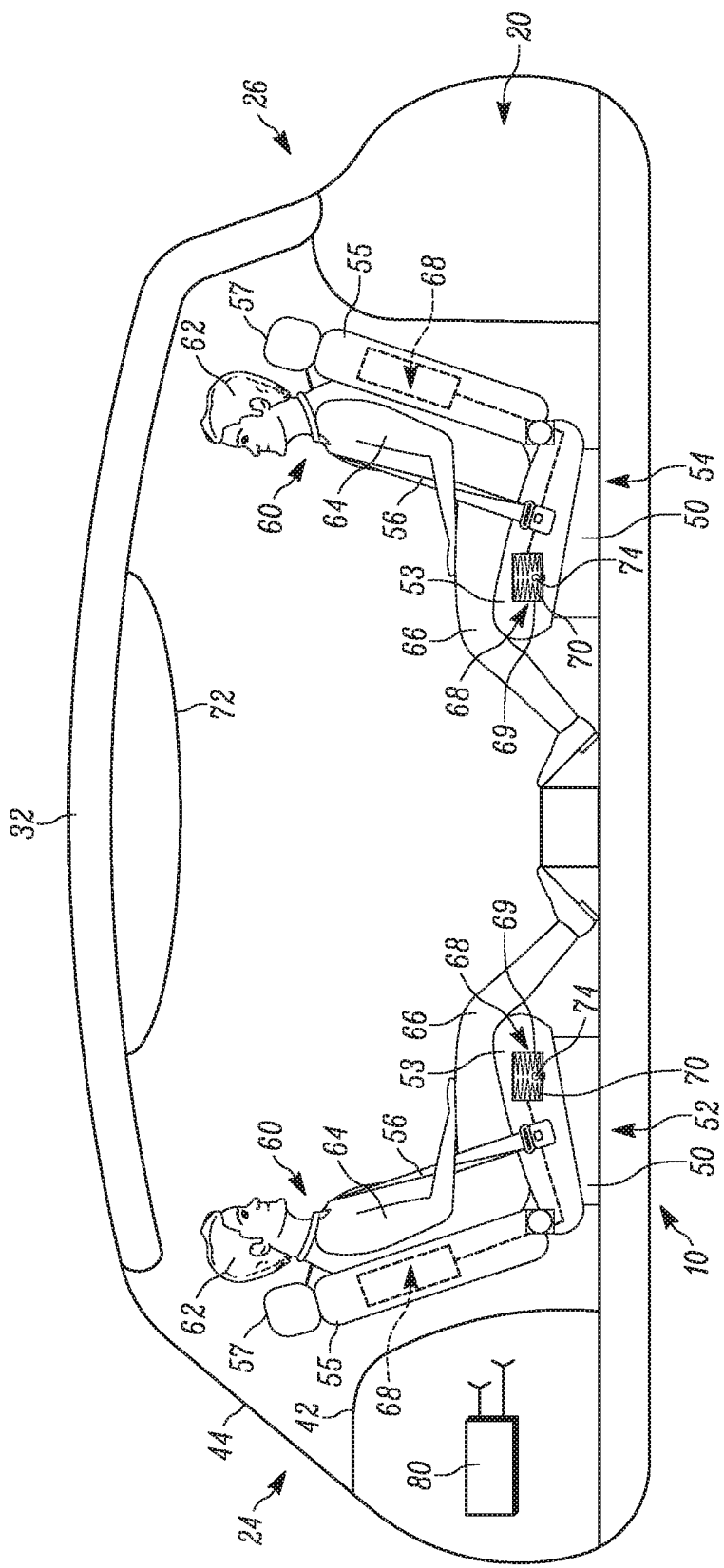
FIG. 3 is a schematic illustration of a cabin of the vehicle with a second seating arrangement and another example airbag of the restraint system in a stored condition.

In another seating arrangement shown in FIG. 3, the vehicle 20 includes two rows of seats 50 that face each other, with the front for 52 being rearward-facing and the rear row 54 being forward-facing. For the unconventional, forward-rearward seating arrangement of FIG. 3, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Regardless of the seating arrangement, each seat 50 includes a base or bottom 53 for receiving the lower legs/lap/knees 66 of the occupant 60. A seatback 55 extends from the base 53 towards the roof 32 and receives the upper torso 64 of the occupant 60. A headrest 57 is connected to the seatback 55 and receives the head 62 of the occupant 60.

In either seating arrangement, since the front row 52 need not face forward and/or need not be in close proximity to the instrument panel 42 or the area where an instrument panel would normally reside, there can be a large volume of space between the front row and the forward cabin structure presented facing the front row. That said, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 includes at least one vehicle occupant protection device in the form of an inflatable airbag 70 housed/concealed in the seats 50 behind, for example, seat upholstery. Mounting the airbags 70 in the seats 50 is convenient because each airbag can be positioned in a location with a desired proximity to the occupant(s) 60 it is intended to help protect. This can help reduce the necessary inflatable volume of the airbags 70 and can also help provide a desired airbag deployment time without requiring an excessively high-volume inflator.

The airbag 70 is stored in a module 68 having a housing 69. In the example configuration of FIG. 2, the airbag modules 68 are mounted in a base 53 of each seat 50. The airbag modules 68 could be mounted at alternative locations in the seats 50 (e.g., in the seatbacks 55 of the seats 50 (shown in phantom) or have portions mounted in both the base and the seatback). The headrests 57 can also come into play when configuring the occupant restraint system 10, especially in the case of a rearward facing occupant (see FIG. 3). Of course, each mounting location brings different challenges in terms of configuring the airbag module 68. These challenges and their respective solutions will become apparent in the paragraphs that follow.

Mounting the modules 68 in the seat base 53 allows for rapid deployment into a position extending laterally across the width of the seat 50 and in front of the occupant 60. The airbags 70 can be configured to deploy from their mounting locations inboard and/or outboard, depending on factors such as the architecture of the vehicle 20 and the resulting space through which the airbags can deploy. Regardless of whether the airbag 70 is mounted in a seat 50 on the left side 28, right side 30 or along the centerline (middle seat) of the vehicle 20, the airbag 70 inflates and deploys laterally in the cabin 40 (i.e., transverse to the centerline 22 of the vehicle). This is true when the module 68 is mounted on the left side [of the direction the occupant 60 is facing] or the right side of the seat 50.

In any case, the airbag 70 is at least one of rolled and folded before being placed in the housing 69 of the module 68. The module 68 is then placed within the base 53 of the seat 50 and covered with the seat upholstery and/or a door. The occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

Figure 4:
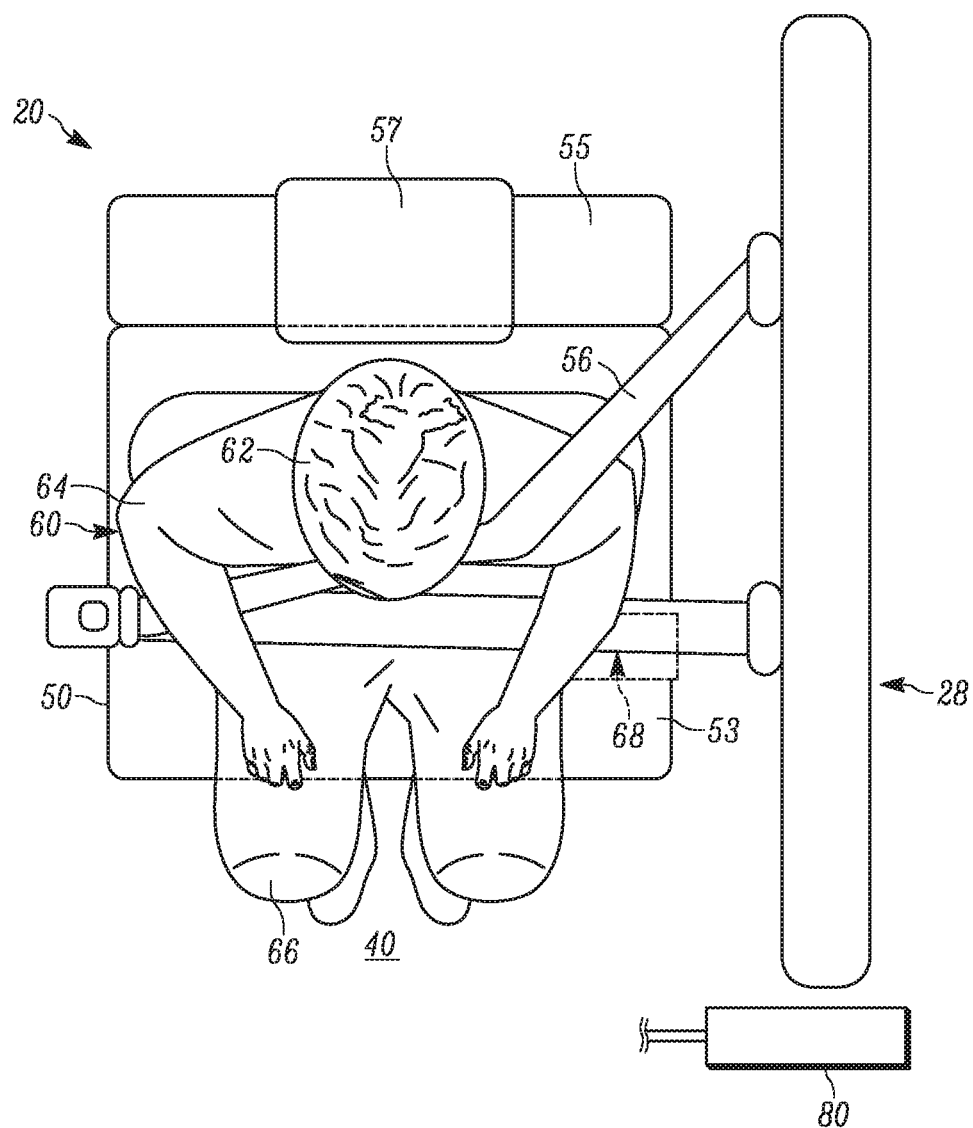
FIG. 4 is a top view of a seat with the airbag in the stored condition.

The occupant restraint system 10 can include multiple airbags 70 provided in each seat 50 in each row 52, 54. In other words, each seat 50 in the vehicle 20 can have an individual module 68 (with corresponding airbag 70 and inflator 74) associated therewith (see also FIG. 4). Alternatively, a single module 68 and, thus, a single airbag 70 and inflator 74 can be associated with an entire row 52 or 54 of seats 50.

Regardless, each airbag 70 is positioned in the base 53 of the seat 50 in front of the seatbelt 56 associated with that seat (i.e., forward of the seatbelts 56 in the front row 52 and forward of the seatbelts in the rear row 54 in FIG. 2; rearward of the seatbelts in the front row and forward of the seatbelts in the rear row in FIG. 3). Although the airbags within each seat 50 are identical for each row provided in the vehicle 20, the construction and operation of only the airbag associated with a seat 50 in the rear row 54 is discussed for brevity.

As shown in FIG. 2, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the housing 69, which causes both the housing and the seat upholstery to open (e.g., via tear seam or door). This releases the airbag 70 to inflate and deploy from stored condition behind the seat upholstery to a deployed condition extending into the cabin 40 forward of and aligned with the seat 50 in the rear row 54. The airbag 70, while inflated, helps protect the vehicle occupant 60 in the rear row 54 by absorbing the impact of the occupant.

Figure 5:
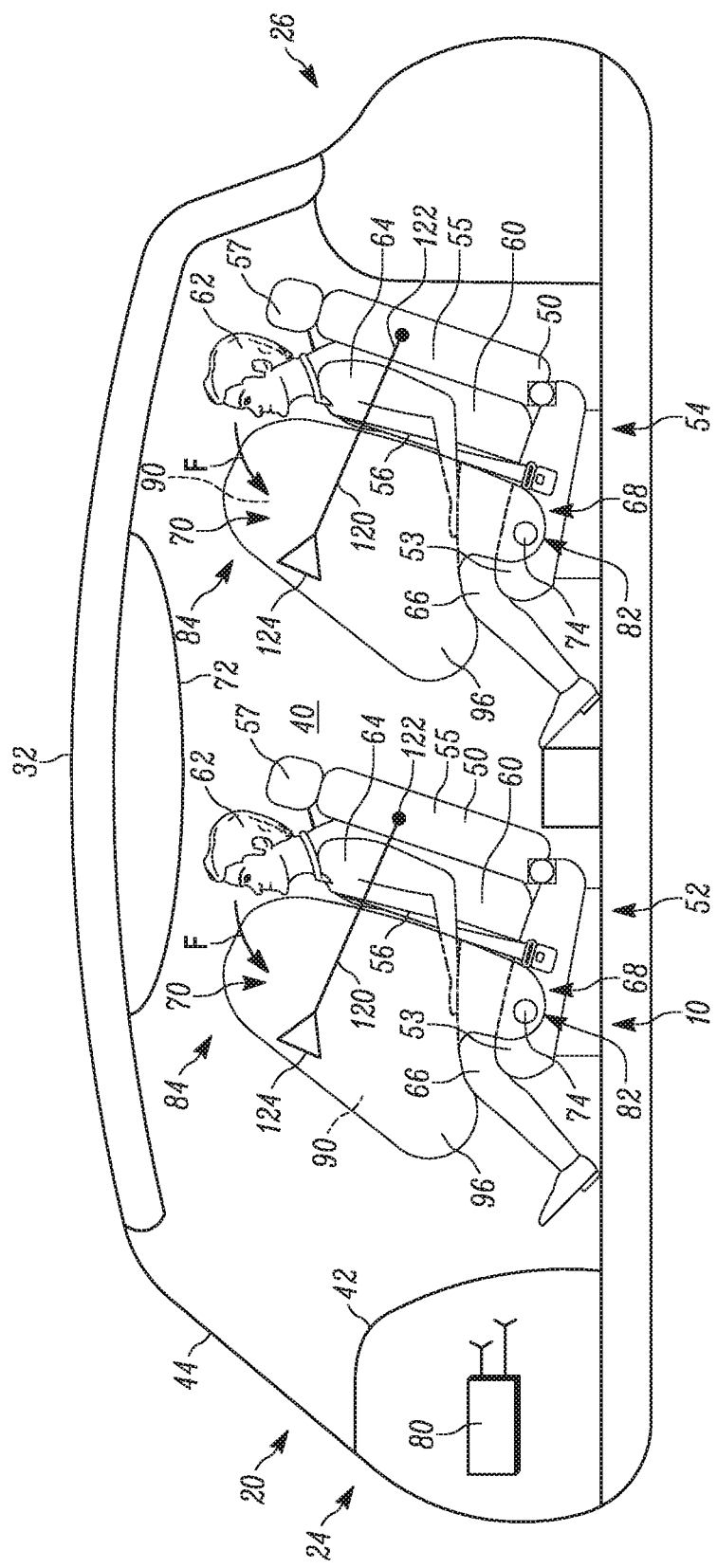
FIG. 5 is a schematic illustration of the airbag in a deployed condition.
Figure 6:
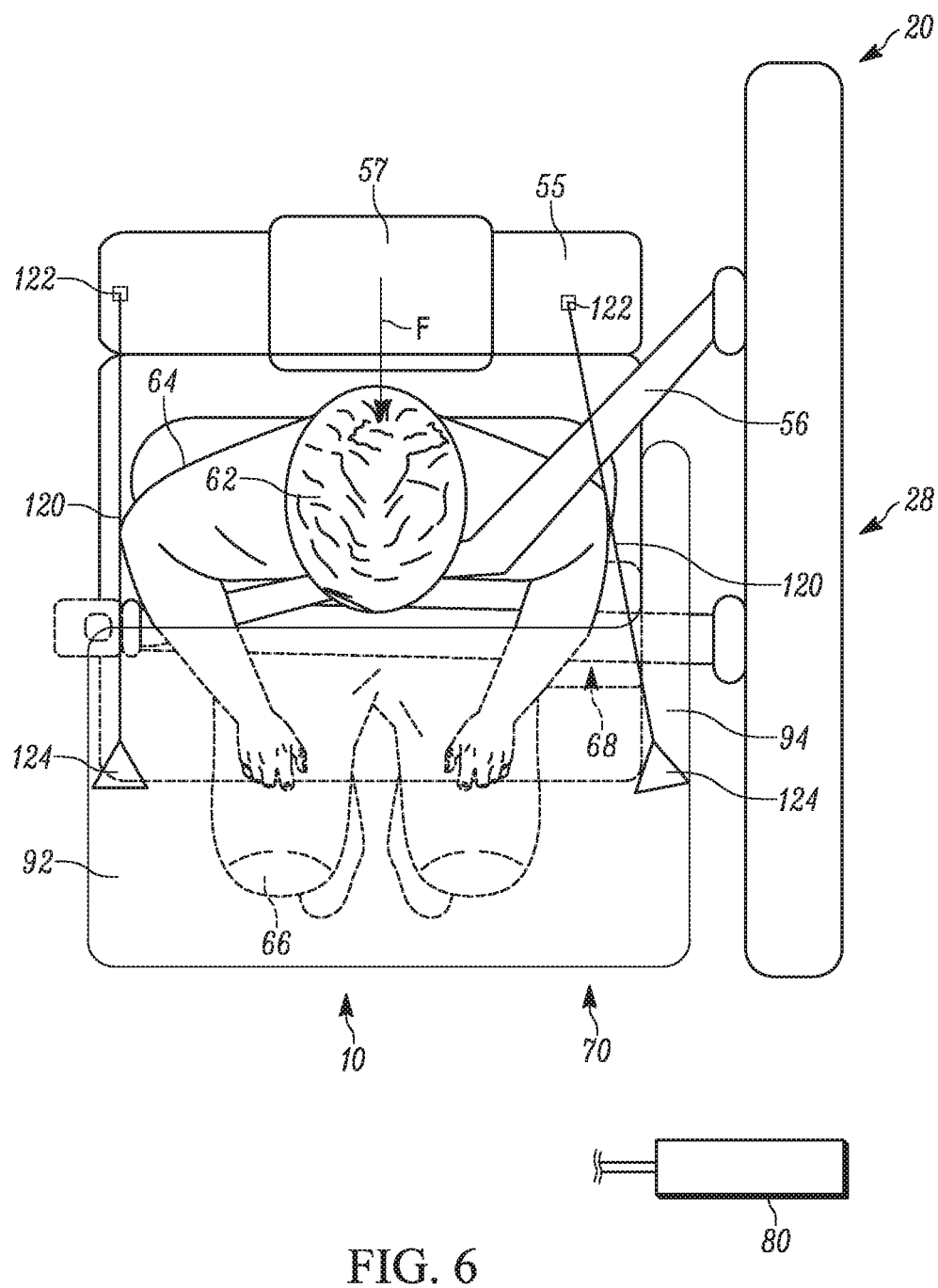
FIG. 6 is a top view of the occupant in the seat of FIG. 4 with the airbag in the deployed condition.

As shown in FIGS. 5-6, the airbag 70 inflates from its stored locations in the seat bottom 53 to its deployed condition. The airbag 70, when deployed, extends from a lower end 82 to an upper end 84 and defines an inflatable volume 90. The lower end 82 is connected to the seat 50 and fluidly connected to the inflator 74. The upper end 84 is positioned adjacent an occupant 60 in the rear row 54.

In its deployed condition, the airbag 70 is configured to extend across the width of the seat 50 in front of the occupant 60 and upward from the seat to a position sufficient to receive and help protect the occupant's head 62 and upper torso 64. The airbag 70 can also be configured to have a lower portion 96 that covers the occupant's knees and the upper portion of the lower legs 66. As shown, the lower portion 96 extends forward and downward away from the seatback 55 generally towards the occupant's feet. In any case, the airbag 70 can inhibit the lower legs 66 from extending and help prevent injuries, such as hyperextension.

The extent of the airbag 70 deployment vertically and/or horizontally (as shown in FIG. 5) can be adjusted in order to adjust the coverage of the airbags. To this end, the airbag 70 can be configured to extend further inboard and/or outboard in order to help protect the occupant 60 in the event of an oblique or offset collision. The inflated depth of the airbag 70 (in the direction of the centerline 22) can also be adjusted.

As noted, there is no vehicle structure in position to act as a reaction surface to constrain movement of the deployed airbag 70. That said, tethers 120 (FIG. 5) can support the airbag 70 against movement in response to occupant penetration. More specifically, the tethers 120 replace the reaction surface typically required for frontal passenger airbags. To this end, a pair of tethers 120 can be provided for the airbag 70 on the inboard and outboard sides thereof on opposite sides of the seat 50 and therefore on opposite sides of the occupant 60.

As shown in FIG. 6, the tethers 120 are positioned inboard and outboard of the occupant 60. The tethers 120 extend from first ends 122 connected to the seat 50 to second ends 124 connected to the inboard and outboard sides 92, 94, respectively, of the airbag 70. The second end 124 can constitute or include a stress reducer for spreading the connection between the tethers 120 and the airbags 70 over a large surface of the airbag fabric so as to prevent tearing. The first ends 122 can be located in the seatbacks 55 and, thus, the airbag module 68 can have portions in both the seat base 53 and the seatback. Each tether 120 can therefore extend from its connection at the first end 122 to the airbag 70 in the seat base 53 portion of the module 68 to its connection at the second end 124 to the seatback 55 portion of the module.

Because the occupant 60 is belted, a frontal crash resulting in forward occupant 60 movement causes the occupant to bend at the waist and follow an angled or arcuate path toward the airbag 70, as indicated generally by the arrow F in FIG. 5. As shown in FIG. 5, for example, the tethers 120 can extend substantially perpendicular to the seatback 55. Once the moving occupant 60 engages the airbag 70, the airbag is urged to move in the direction F. The tethers 120, being connected to the seat 50 and the sides 92, 94 of the airbag 70, help prevent the airbag from moving in the direction F.

Advantageously, as shown in FIGS. 5-6, the locations of the first end 122/seat 50 connections can be selected such that the tethers 120 extend in a direction or along a path that approximates or coincides with (i.e., lies substantially parallel to or coextensive with) the path along which the occupant 60 travels into contact with the airbag 70. In this manner, the tension the tethers 120 apply to the airbag 70 can be opposite the impact forces applied to the airbag by the penetrating occupant 60. As a result, the seat 50 (particularly the seatback 55), through the tethers, acts as the reaction surface for the airbag 70. The airbag 70 therefore provides a ride-down effect on the moving occupant 60 to thereby help reduce loads thereon. To this end, the airbag 70 accommodates the moving occupant 60 by providing a more gradual reaction force in response to occupant penetration. The example configuration of FIGS. 1-6 therefore requires no interaction with forward structure of the vehicle 20, such as an instrument panel, steering wheel, or seat, to provide a reaction surface for the airbag 70.

The airbags 70 of FIGS. 1-6 can include the tethers 120 while at the same time having a variety of configurations. For example, the airbags 70 can include internal tethers (not shown) for helping to shape or otherwise control their inflated configurations. Such tethers could, for example, create pockets or areas of reduced surface tension for improving occupant protection, such as by providing an enhanced degree of cushioning for the occupant's upper torso and/or head.

Moreover, it will be appreciated that the lower portion 96 of the airbag 70 and/or the remainder of the lower end 82 can also act as a reaction surface for the airbag. In particular, movement of the occupant 60 along the path F can cause the lower end 82 of the airbag 70 to engage the occupant's knees and the upper portion of the lower legs 66. As a result, the lower legs 66 of the occupant 60 provides a reaction force that is opposite the impact forces applied to the airbag 70 by the penetrating occupant. Consequently, the occupant 60 themselves can help provide a ride-down effect as they penetrate the airbag 70.

Figure 7:
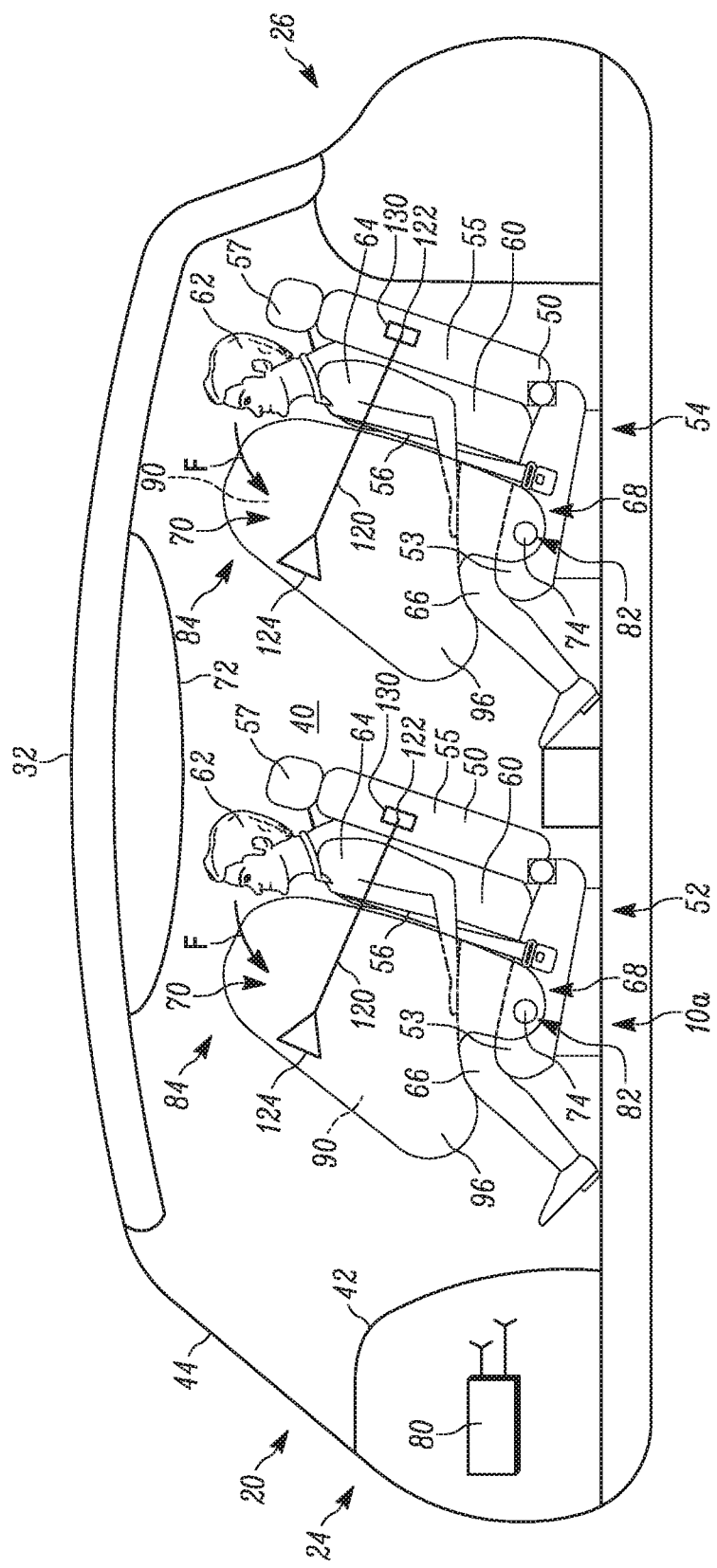
FIG. 7 is a schematic illustration of another example restraint system with an airbag in a deployed condition.
Figure 8A:
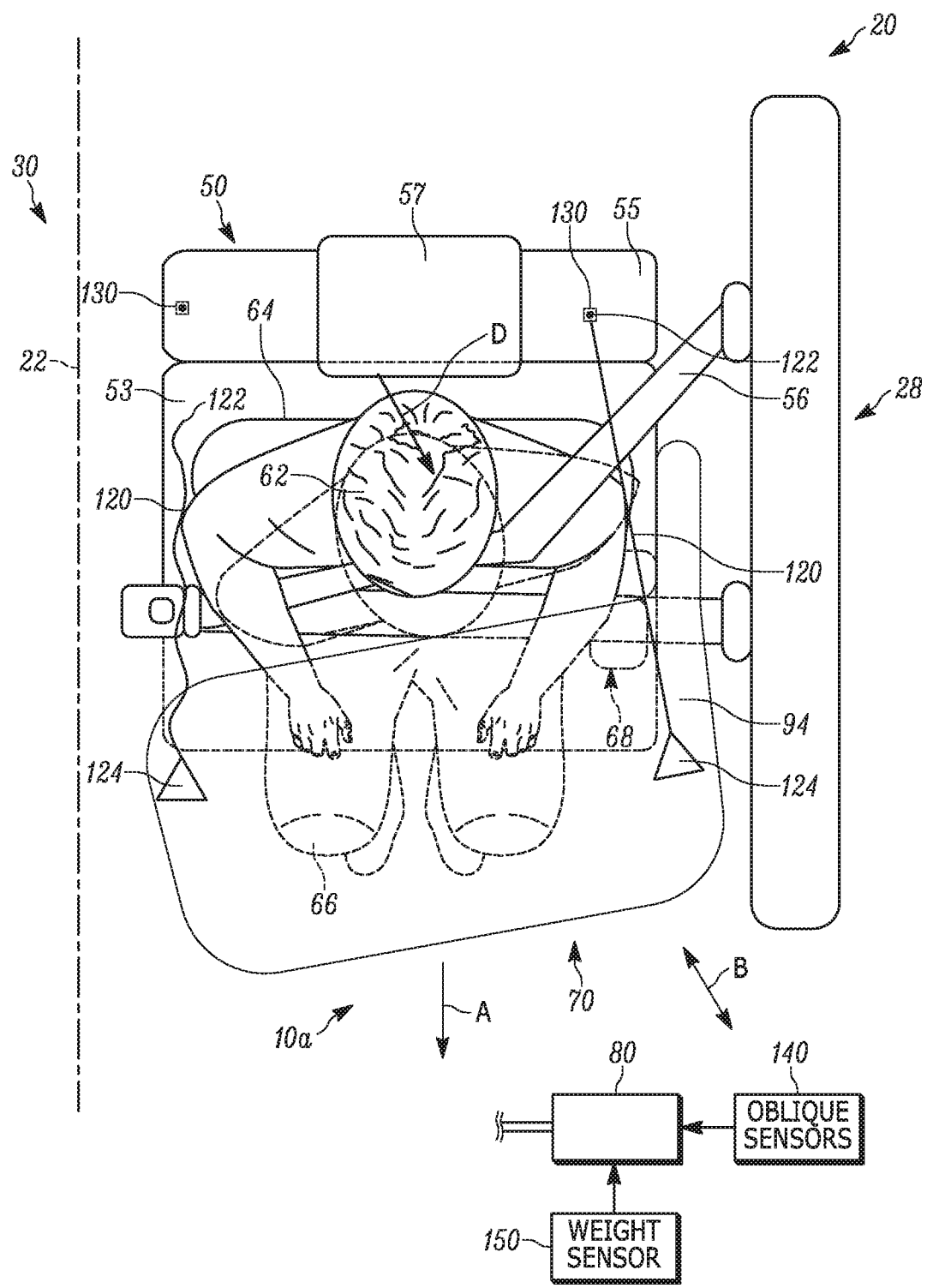
FIG. 8A is a top view of the restraint system of FIG. 7 in a left oblique crash.
Figure 8B:
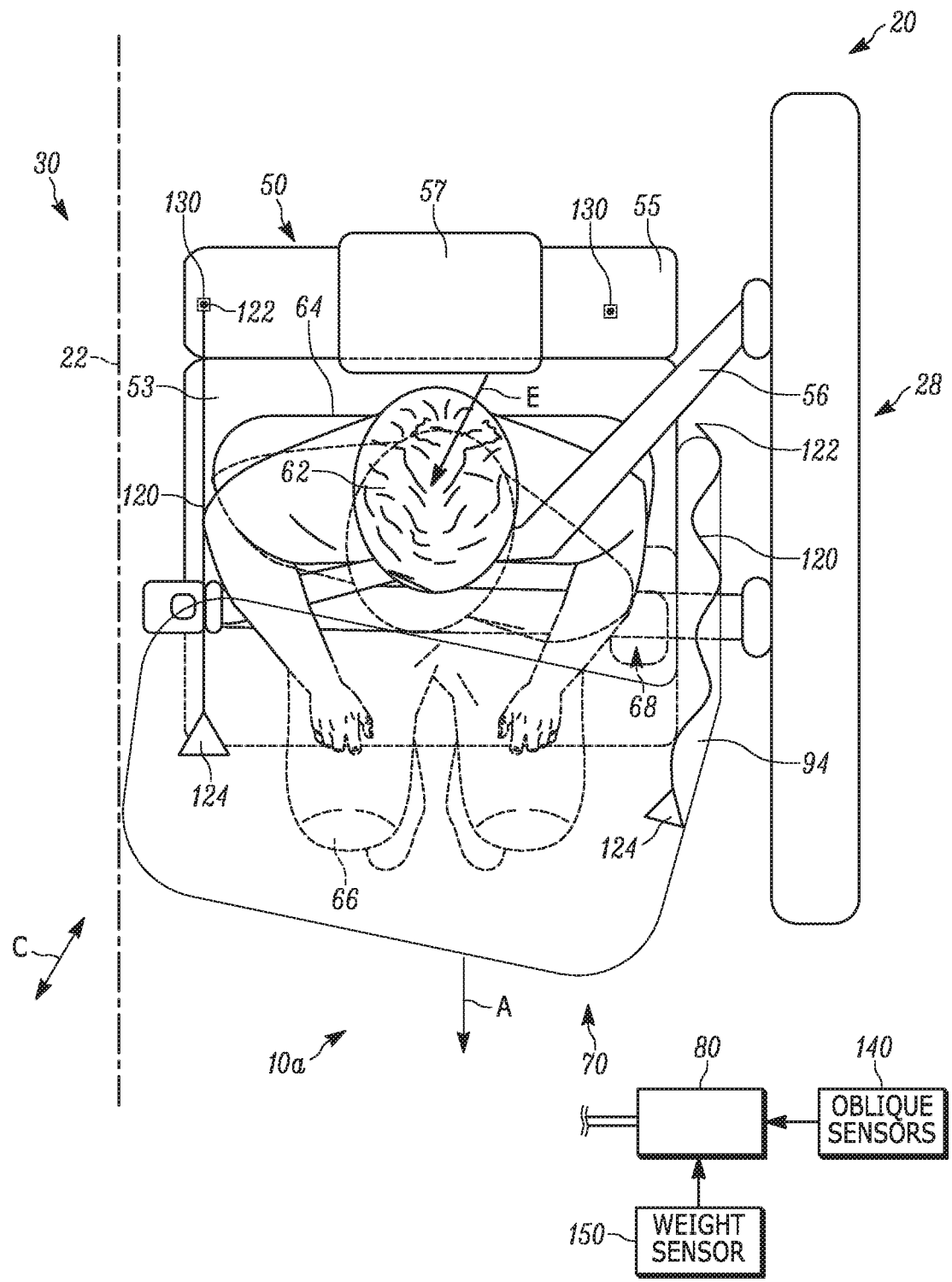
FIG. 8B is a top view of the restraint system of FIG. 7 in a right oblique crash.

FIGS. 7-8B illustrate another example configuration of the occupant restraint system 10a. In FIGS. 7-8B, the airbag module 68 includes the airbag 70, tethers 120, and a tether actuation units 130 associated with each tether. The first end 122 of each tether 120 is secured to one of the tether actuation units 130, which are actuatable to control operation of the tethers. The tether actuation units 130 can, for example, be actuatable fasteners that releasably connect the first ends 122 of the tethers 120 to the seat 50. The tether actuation units 130 are actuatable to release the tether 120 connection to the seat 50 in response to sensed vehicle and/or occupant 60 conditions at the time of the accident. For example, the tether actuation units 130 can be actuated in response to detecting the occurrence of an oblique or offset vehicle condition. Alternatively, the tether actuation units 130 can be configured to control the lengths of the tethers 120 by spooling/unspooling one or both tethers in response to detecting the occurrence of an oblique or offset vehicle condition. In any case, the tether actuation units 130 are provided on the left and right sides of each seat 50 (e.g., in the base 53 or seatback 55).

As another example, the tether actuation units 130 can be actuated in response to a sensed position of the occupant 60. These sensed occupant positions can, for instance, be an out of position occupant 60 (i.e., leaned forward or to the side) or reclined. In any case, operating the tethers 120 can allow the airbags 70 to achieve a position better suited to protect the occupants 60, given the sensed vehicle and/or occupant conditions.

Referring to FIG. 8A, an oblique impact is meant to refer to scenarios where the impact results in the occupant 60 moving obliquely forward in the vehicle 20 in a direction that is non-parallel to the vehicle centerline 22 and the direction of forward vehicle travel (see arrow A). For example, a left oblique impact can occur on the left side 28 of the vehicle 20 in response to, for example, the vehicle skidding at an angle into another vehicle or barrier, or in response to being struck by another vehicle moving at an angle. The left oblique impact is illustrated generally by the double arrow labeled B. Similarly, a right oblique impact can occur on the right side 30 of the vehicle 20 in response to, for example, the vehicle skidding at an angle into another vehicle or barrier, or in response to being struck by another vehicle moving at an angle. The right oblique impact is illustrated generally by the double arrow labeled C in FIG. 8B.

In the event of an oblique impact, the occupant 60 moves forward in the vehicle 20 in a direction that is angled either inboard of the vehicle (i.e., toward the vehicle centerline 22 or right side 30) or outboard of the vehicle (i.e., toward the left side 28). In the event of a left oblique impact B (FIG. 8A), the occupant 60 moves forward-outboard (in the direction D toward the position indicated generally in dashed lines). Conversely, in the event of a right oblique impact C (FIG. 8B), the occupant 60 moves forward-inboard in the direction E toward the position indicated generally in dashed lines).

Of course, the oblique direction in which the occupant 60 moves, and their resulting position, can vary depending on the particulars of the impact event, such as the angle and/or velocity at which the vehicle 20 impacts another vehicle or object. Therefore, the oblique outboard and inboard directions of occupant 60 movement indicated by the respective arrows D and E, and the resulting respective position of the occupant, is by way of example only.

The degree to which the airbag 70 can help protect the occupant 60 in an oblique impact depends on the degree to which the occupant movement deviates from the forward direction (i.e., the angle between arrows A and D or between arrows A and E). As the degree to which the occupant 60 movement deviates from the forward direction (i.e., as the angle increases) the ability of the airbag 60 to help protect the occupant 60 when deploying in the manner shown in FIGS. 1-6 also decreases. Thus, as the occupants' movements become increasingly oblique, the ability of the airbag 70 shown in FIGS. 1-6 to help protect the occupant 60 decreases.

Accordingly, in the event of a left oblique impact B it may be desirable for the tether actuation unit 130 on the inboard side of the seat 50 to release so that the airbag 70 can shift or rotate outboard to help receive and better protect the occupant 60 moving in the direction D. Similarly, in the event of a right oblique impact C it may be desirable for the tether actuation unit 130 on the outboard side of the seat 50 to release so that the airbag 70 can shift or rotate inboard to help receive and better protect the occupant 60 moving the in the direction E.

To this end, the occupant restraint system 10*a* can include at least one oblique crash sensor 140 connected to the controller 80 for determining when actuation of one or more of the tether actuations units 130 is appropriate. The oblique crash sensors 140 can be located on the left and right sides 28, 30 of the vehicle 20 (e.g., on the front bumper, front quarter panels, and/or side view mirrors).

When one or more oblique crash sensors 140 indicate the left oblique impact B of FIG. 8A, the controller 80 actuates the tether actuation unit 130 associated with the inboard tether 120, which releases (or unspools) the first end 122 of the inboard tether. As a result, the inboard tether 120 no longer restrains movement of the airbag 70 away from the seat 50. Consequently, forward-outboard occupant movement D causes the airbag 70 to shift or rotate about the second end 124 of the outboard tether 120 and/or about the lower end 82/module 68 connection in the counterclockwise direction (as shown in FIG. 8A). Since the lower end 82 of the airbag 70 remains connected to the module 68 and the outboard tether 120 remains connected to the airbag, the occupant is able to move with the shifting airbag in a controlled manner.

On the other hand, when one or more oblique crash sensors 140 indicate the right oblique impact C of FIG. 8B, the controller 80 actuates the tether actuation unit 130 associated with the outboard tether 120, which releases (or unspools) the first end 122 of the outboard tether. As a result, the outboard tether 120 no longer restrains movement of the airbag 70 away from the seat 50. Consequently, forward-inboard occupant movement E causes the airbag 70 to shift or rotate about the second end 124 of the outboard tether 120 in the clockwise direction (as shown in FIG. 8B).

Since the lower end 82 of the airbag 70 remains connected to the module 68 and the inboard tether 120 remains connected to the airbag, the occupant is able to move with the shifting airbag in a controlled manner. In both oblique impacts B, C, the shifting airbag 70 provides a ride-down effect on the penetrating occupant 60 by gradually dissipating the impact force on the occupant by the airbag. Advantageously, the shifting airbag 70 more closely aligns with the forward-outboard D or forward-inboard E movement of the occupant 60.

Alternatively or additionally, the tether actuation units 130 can be actuated in response to a sensed position of the occupant 60. The sensed occupant 60 position can, for instance, be an out of position occupant (i.e., leaned forward or to the side) or reclined. The position of the occupant 60 can be monitored by one or more weight sensors 150 connected to the seat 50 (e.g., in the base 53 or seatback 55). One or more cameras (not shown) can also be provided in the cabin 40 and have a field of view that includes the occupant 60 in the seat 50.

The controller 80 is connected to the weight sensors 150 (and the cameras when present) and receives signals from the weight sensors indicative of the position of the occupant 60. The controller 80 can then rely on the signals from the weight sensors 150 to determine when the occupant 60 is out of position and therefore likely to move in the inboard or outboard direction in response to a vehicle 20 crash. Once the determination is made, the controller 80 can then determine whether to actuate either of the tether actuation units 130 to release one of the tethers 120 and allow the airbag 70 to shift inboard or outboard accordingly.

Although the impacts and occupant 60 movement shown and described refer to an occupant in a seat 50 on the left side 28 of the vehicle 20 it will be appreciated that the controller 80 and tether actuations units 130 can also account for movement of occupants on the right side 30 of the vehicle 20 (not shown). More specifically, a left oblique impact B causes the occupant 60 on the right side 30 to move in the forward-inboard direction. When this occurs, the outboard tether actuation unit 130 associated with the seat 50 on the right side 30 is actuated to release (or unspool) the outboard tether 120. On the other hand, a right oblique impact C causes the occupant 60 on the right side 30 to move in the forward-outboard direction. When this occurs, the inboard tether actuation unit 130 associated with the seat 50 on the right side 30 is actuated to release (or unspool) the inboard tether 120.

From the above, it will be appreciated that the example configurations of FIGS. 1-8B illustrate that the airbag 70 is configured to utilize the vehicle seat 50 as a reaction surface regardless of whether the seats are in the conventional seating arrangement (FIG. 2) or the unconventional seating arrangement (FIG. 3). By "reaction surface," it is meant that it is the vehicle seats 50 that support their respective airbags 70 against movement in response to an impacting occupant (s) 60. This allows the airbags 70 to absorb impact forces of the occupants 60 and provide the desired ride-down effect. Advantageously, the example configurations can rely only the vehicle seat 50 to provide the reaction surface and can provide effective occupant protection without requiring any support from structure other than the seats. The vehicle seats 50 can thereby support the airbag modules 68 and the airbags 70 entirely.

Advantageously, each of the airbag modules 68 is contained within the structure of its respective seat 50. The airbags 70 are therefore tasked with protecting only the occupant 60 of the particular seat 50 to which the module 68 is mounted. This allows the modules 68 to be moved with the seat 50 (e.g., within the base 53 or seatback 55) so that occupant protection can be afforded to the occupant of the seat, regardless of its position and orientation in the vehicle.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

We claim:

1. A restraint system for helping to protect an occupant of a vehicle having a roof and a cabin with a seat for the occupant, comprising:
    an airbag having a stored condition within a seat base of the vehicle seat and being inflatable to a deployed condition extending across the width of the seat in front of the occupant from outboard of the vehicle seat to inboard of the vehicle seat, wherein the airbag is configured to utilize the vehicle seat as a reaction surface for restraining the movement of the airbag in response to occupant penetration into the airbag;
    at least one tether having a first end connected to the airbag and a second end connected to a seatback of the vehicle seat, the at least one tether being configured to transmit the energy of the occupant penetrating the airbag to the vehicle seatback; and
    at least one tether actuation unit that connects the second end of the at least one tether to the seatback, wherein the at least one tether actuation unit is configured to release the at least one tether in response to detecting an oblique vehicle crash to allow the airbag to shift laterally in response to the occupant penetrating into the airbag.

2. The restraint system recited in claim 1, wherein the at least one tether comprises first and second tethers each having a first end connected to the airbag and a second end connected to the vehicle seat on opposite lateral sides of the vehicle seat.

3. The restraint system recited in claim 2, wherein the second end of each tether is connected to the vehicle seat behind the vehicle occupant.

4. An airbag module comprising the restraint system of claim 1 and further comprising a housing configured to be mounted in the vehicle seat and an inflator for providing inflation fluid for inflating the airbag.

5. The restraint system recited in claim 1, further comprising:
    a sensor for sensing the occurrence of an event for which deployment of the airbag is desired and producing a signal indicative thereof; and
    a controller connected to the sensor and, in response to receiving the signal, actuating an inflator to inflate the airbag to the deployed condition.

6. The restraint system recited in claim 1, wherein the airbag is a component of an airbag module that is installed in the vehicle seat, the airbag being connected to the vehicle seat via a connection to the airbag module; wherein the connections of the at least one tether to the airbag and to the vehicle seat are remote from the airbag module.

7. The restraint system recited in claim 6, wherein the airbag has a lower end portion connected to the seat via the airbag module and an upper end portion connected to the seat via the at least one tether.

8. The restraint system recited in claim 7, wherein the lower end portion is connected to the seat base of the vehicle seat and the at least one tether is connected to the seatback of the vehicle seat.

9. The restraint system recited in claim 7, wherein the lower end portion is connected to a first lateral side of the vehicle seat and the at least one tether is connected to an opposite lateral side of the vehicle seat.

10. The restraint system recited in claim 6, wherein the at least one tether is connected to the vehicle seat behind the seated occupant.

11. The restraint system recited in claim 1, wherein the airbag is configured to be free from reliance on vehicle structure positioned forward of the vehicle seat as a reaction surface.

12. A restraint system for helping to protect an occupant of a vehicle having a roof and a cabin with a seat for the occupant, comprising:
    an airbag having a stored condition within the vehicle seat and being inflatable to deploy laterally in the cabin to a deployed condition extending across the width of the seat in front of the occupant, wherein the airbag is configured to utilize the vehicle seat as a reaction surface for restraining the movement of the airbag in response to occupant penetration into the airbag;
    first and second tethers each having a first end connected to the airbag and a second end connected to the vehicle seat on opposite lateral sides of the vehicle seat; and
    first and second tether actuation units that connect the second ends of the tethers to the vehicle seat, one of the tether actuation units being actuatable in response to detecting an oblique vehicle crash to release one of the first and second tethers and allow the airbag to shift laterally in the cabin in response to occupant penetration.

13. The restraint system recited in claim 12, wherein the first actuation unit and the first tether are positioned on a right side of the seat and wherein the first actuation unit releases the first tether in response to a left-side oblique vehicle crash.

14. The restraint system recited in claim 12, wherein the second actuation unit and the second tether are positioned on a left side of the seat and wherein the second actuation unit releases the second tether in response to a right-side oblique vehicle crash.

15. The restraint system recited in claim 12, further comprising:

an oblique crash sensor connected to the vehicle for providing a signal indicative of an oblique vehicle crash; and a controller for receiving the signal from the oblique crash sensor and connected to the tether actuation units for releasing the tether in response to the signal.

16. The restraint system recited in claim 12, wherein the airbag is configured to be free from reliance on vehicle structure positioned forward of the vehicle seat as a reaction surface.

17. A restraint system for helping to protect an occupant of a vehicle having a roof and a cabin with a seat for the occupant, comprising:

an airbag having a stored condition within a seat base of the vehicle seat and being inflatable to a deployed condition extending across the width of the seat in front of the occupant from outboard of the vehicle seat to inboard of the vehicle seat, wherein the airbag is configured to utilize the vehicle seat as a reaction surface for restraining the movement of the airbag in response to occupant penetration into the airbag;

at least one tether having a first end connected to the airbag and a second end connected to a seatback of the vehicle seat, the at least one tether being configured to transmit the energy of the occupant penetrating the airbag to the vehicle seatback, wherein the at least one tether comprises first and second tethers each having a first end connected to the airbag and a second end connected to the vehicle seat on opposite lateral sides of the vehicle seat; and first and second tether actuation units that connect the second ends of the tethers to the vehicle seat, one of the tether actuation units being actuatable in response to detecting an out of position occupant to release one of the first and second tethers and allow the airbag to shift laterally in the cabin in response to occupant penetration.

18. The restraint system recited in claim 17, further comprising at least one weight sensor connected to the seat for providing a signal indicative of a position of the occupant in the seat; and a controller for receiving the signal from the at least one weight sensor and connected to the tether actuation units for releasing one of the first and second tethers in response to the signal.

* * * * *